(12) United States Patent
Yang et al.

(10) Patent No.: US 8,472,175 B2
(45) Date of Patent: Jun. 25, 2013

(54) FOLDING ELECTRONIC DEVICE WITH SWIVEL FUNCTION

(75) Inventors: Xin Yang, Shenzhen (CN); Wei Wu, Shenzhen (CN)

(73) Assignees: Fu Tai Hua Industry (Shenzhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 264 days.

(21) Appl. No.: 13/163,716

(22) Filed: Jun. 19, 2011

(65) Prior Publication Data
US 2012/0154996 A1    Jun. 21, 2012

(30) Foreign Application Priority Data
Dec. 16, 2010 (CN) .......................... 2010 1 0591485

(51) Int. Cl.
*H05K 7/16* (2006.01)

(52) U.S. Cl.
USPC .............. 361/679.27; 361/679.01; 455/575.3; 16/354; 16/366; 16/367

(58) Field of Classification Search
USPC ............ 361/679.01, 814; 455/575.3; 16/354, 16/367, 366
See application file for complete search history.

(56) References Cited

U.S. PATENT DOCUMENTS

| | | | | |
|---|---|---|---|---|
| 7,168,135 B2 * | 1/2007 | Jung et al. | ......................... | 16/367 |
| 7,401,383 B2 * | 7/2008 | Pan | ................................ | 16/367 |
| 7,835,143 B2 * | 11/2010 | Shi et al. | .................. | 361/679.01 |
| 8,107,995 B2 * | 1/2012 | Terada et al. | ............... | 455/550.1 |
| 2006/0200941 A1 * | 9/2006 | Kim et al. | ........................ | 16/221 |
| 2009/0036177 A1 * | 2/2009 | Lee et al. | ..................... | 455/575.3 |
| 2009/0273888 A1 * | 11/2009 | Oshima et al. | ............ | 361/679.01 |
| 2010/0254076 A1 * | 10/2010 | Hasegawa et al. | ........ | 361/679.01 |

* cited by examiner

*Primary Examiner* — Tuan T Dinh
*Assistant Examiner* — Mukund G Patel
(74) *Attorney, Agent, or Firm* — Altis Law Group, Inc.

(57) ABSTRACT

A folding electronic device includes a first case, a second case, and a hinge element. The hinge element includes a shaft, a swing member, a toothed gear, and a spring clip. When the first case opens up at an about 180 degree angle relative to the second case from a folded position, the central projection of a spring clip engages with one tooth of the toothed gear, the first case may rotate relative to the second case under the horizontal direction or the vertical direction from any angle between about 0 and 180 degrees.

10 Claims, 5 Drawing Sheets

FOLDING ELECTRONIC DEVICE WITH SWIVEL FUNCTION

BACKGROUND

1. Technical Field

The disclosure relates to folding electronic devices and, more particularly, to a folding electronic device having a swivel function between the two halves.

2. Description of Related Art

When conventional folding phones are used as cameras, the user of the phone often need to face the object to capture the image. However, if the object moves, the user must re-orientate himself or herself to take another picture. Neither is it easy for the user to take an image of himself, as the keypad or other camera controls are on the other side of the device, and hidden from him or her.

Therefore, what is needed is a folding electronic device having a swivel or pivot between the two halves of the folding device to overcome the described shortcomings.

DETAILED DESCRIPTION

Figure 1:
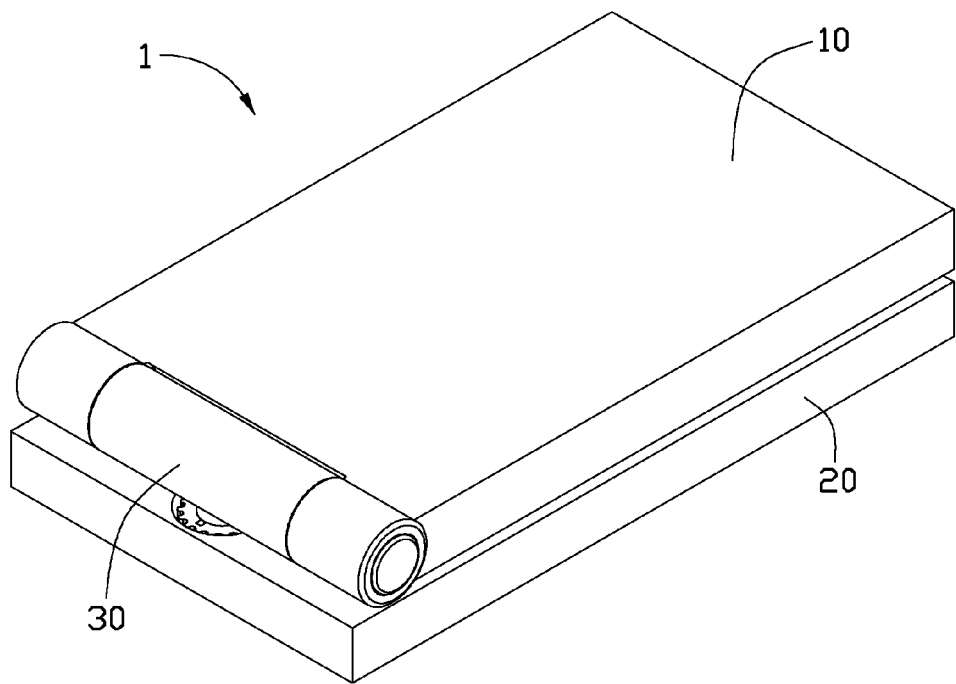
FIG. 1 is a perspective view of a folding electronic device in accordance with an exemplary embodiment.
Figure 2:
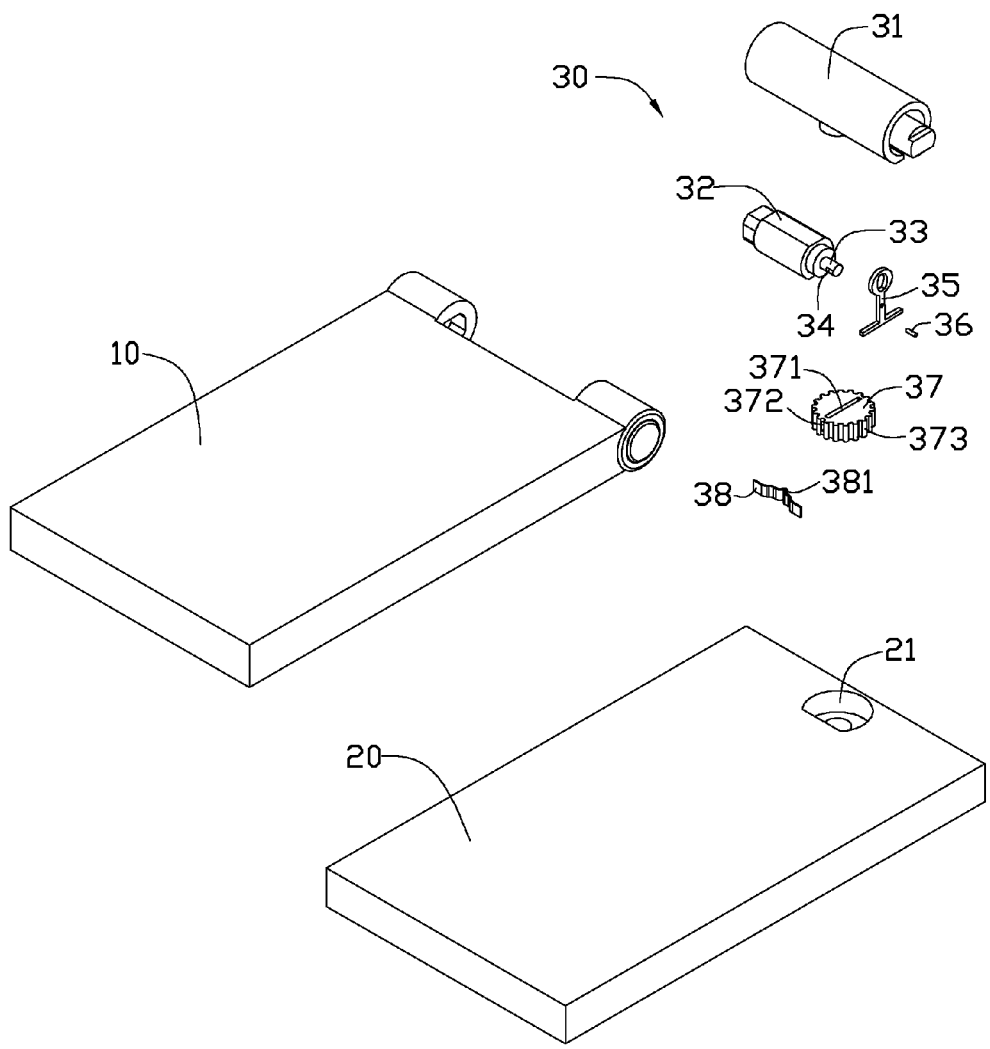
FIG. 2 is an exploded, perspective view of the folding electronic device of FIG. 1.
Figure 3:
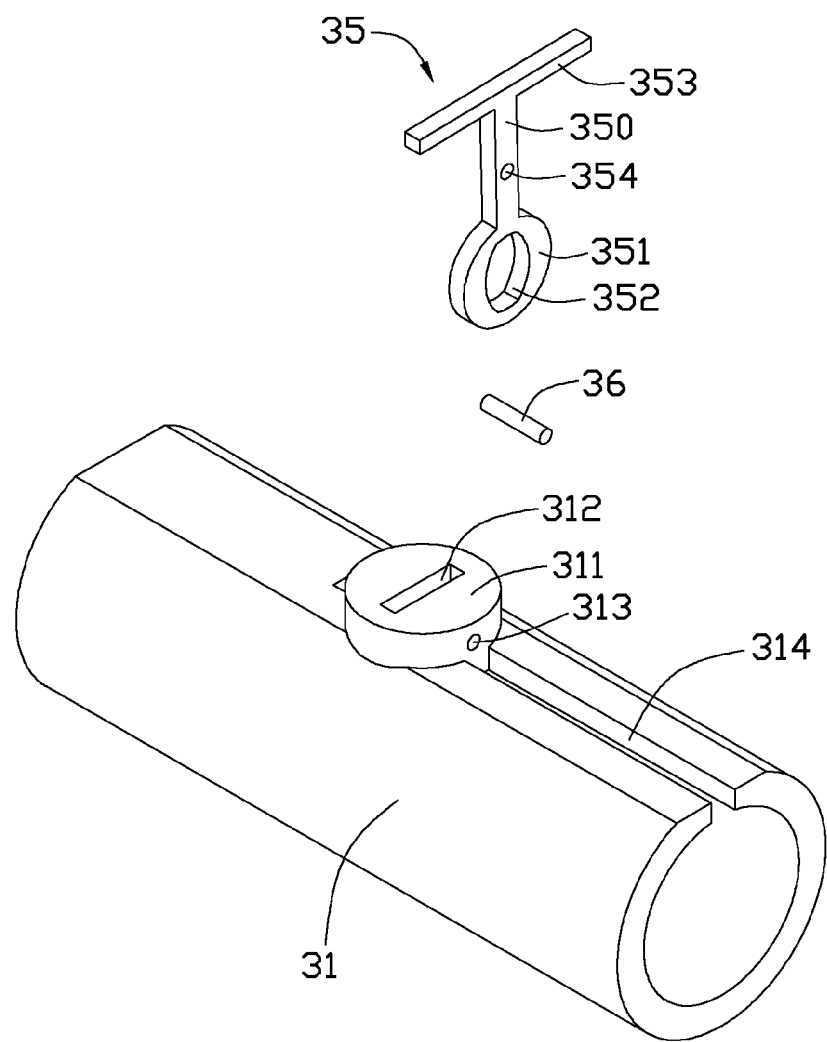
FIG. 3 is an isometric view enlarging a portion of a swing member and a cavity in the folding electronic device shown in FIG. 2.

Referring to FIGS. 1-4, a folding electronic device defines a folded position and an open position. For illustration purposes, a folding mobile phone is used as an example. The mobile phone 1 includes a first case 10, a second case 20, and a hinge element 30 coupled with the first case 10 and the second case 20. The first case 10 hinges on the second case 20 via the hinge element 30.

The hinge element 30 includes a cavity 31, a shaft 32, a swing member 35, a stick 36, a gear 37, and a spring clip 38 to provide lateral pressure. An axial rod 33 extends from one end of the shaft 32. A protruding portion 34 protrudes radically out of the axial rod 33 towards the free end of the axial rod 33. In the embodiment, the protruding portion 34 may be a nipple-like boss or nub.

A base 353 is formed on the bottom of the swing member 35 and the base 353 extends a swing rail 350 from the middle thereof, the base 353 and the rail 350 together substantially forming the shape of an inverted "T". In the embodiment, the base 353 is rectangular. A ring 351 is formed on the top of the swing rail 350 and an elliptic through hole 352 is formed in the middle of the ring 351. The axial rod 33 passes through the elliptic through hole 352, and the axial rod 33 and the protruding portion 34 is snugly fitted between two opposite inner surfaces of the ring 351. The cavity 31 accommodates the shaft 32 and the ring 351. The cavity 31 is connected to the first case 10 via the shaft 32 and the first case 10 hinges on the second case 20 by means of the shaft 32.

A connecting member 311 is connected to the bottom of the cavity 31. The connecting member 311 defines a first round through hole 313 by passing through two sidewalls thereof and a first opening 312 being perpendicular to the shaft 32. The base 353 passes through the first opening 312. A second round through hole 354 is formed in the middle of the swing rail 350. The stick 36 passes through the first and the second round through holes 313, 354 and the stick 36 is parallel with the shaft 32. The swing member 35 may revolve around the stick 36.

A receiving space 21 is formed in the second case 20 and is configured to accommodate the gear 37 and the spring clip 38. Two ends of the spring clip 38 are connected to two sidewalls of the receiving space 21 and a protruding end 381 is formed in the middle of the spring clip 38. A receiving groove 371 is formed in the middle of the gear 37 and two second openings 372 extend from the two ends of the receiving groove 371. The receiving groove 371 accommodates the base 353. The protruding end 381 of the spring clip 38 may engage with each tooth of the gear 38. When the protruding end 381 passes through one second opening 372 and tips one end of the base 353, the base 353 is positioned in the receiving groove 371, the tension in the spring clip 38 holds the gear 37 immobile.

Figure 4:
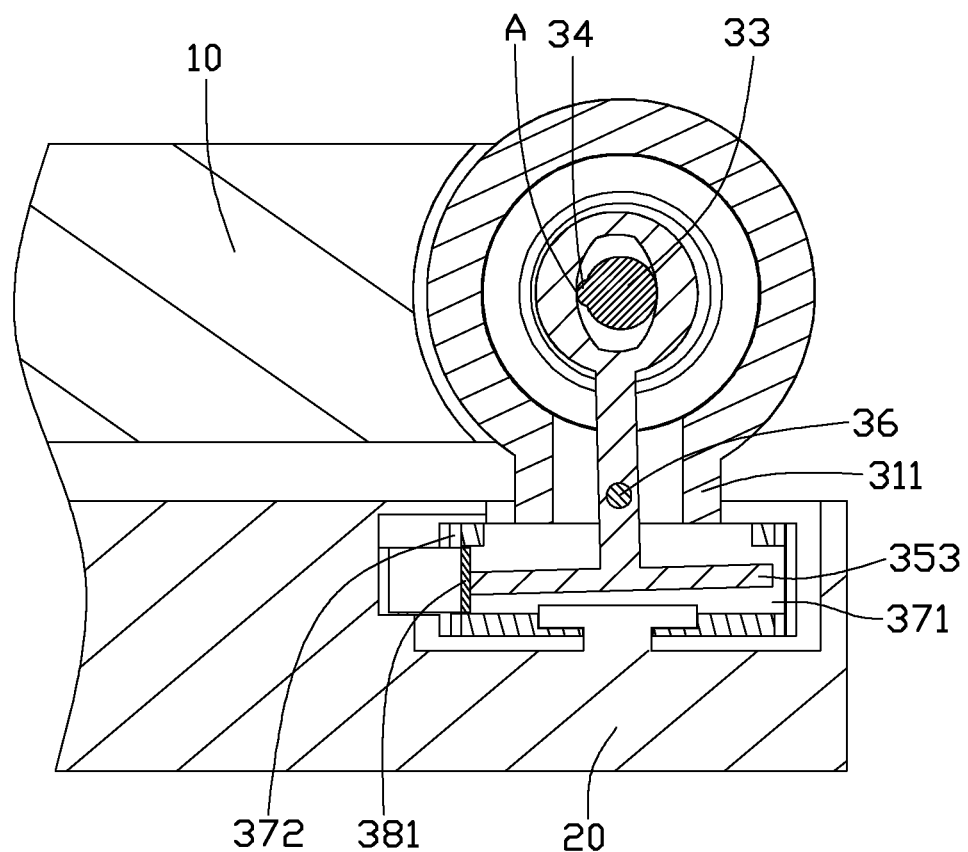
FIG. 4 is a cross-sectional view of the folding electronic device of FIG. 1, in a folded position.

When the mobile phone 1 is folded as shown in FIG. 1, the protruding end 381 tips one end of the base 353 and the gear 37 can not rotate. As shown in FIG. 4, the other end of the base 353 which is farthest from the protruding end 381 tilts up, the protruding portion 34 binds on an inner surface of the ring 351, such as the "A" point of the ring 351, therefore, the first case 10 only hinges in one plane relative to the second case 20 due to the immobile gear 37.

Figure 5:
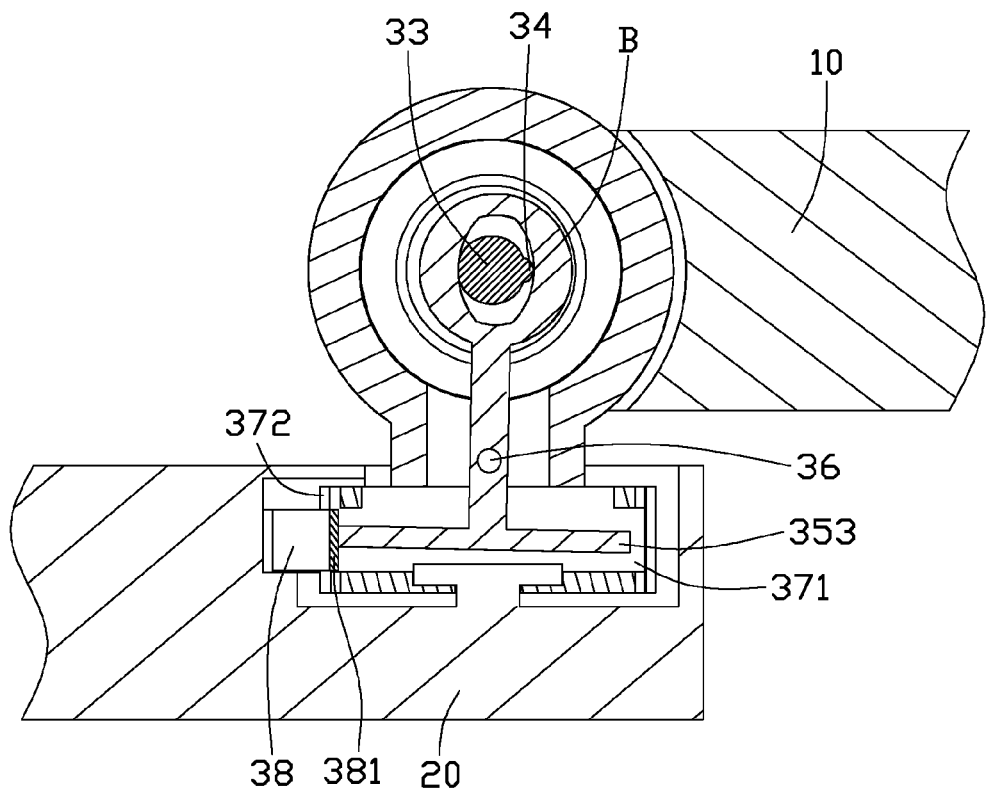
FIG. 5 is a cross-sectional view of the folding electronic device of FIG. 1 in an open position.

Referring to FIG. 5, the mobile phone 1 is unfolded or open. As the mobile phone 1 is unfolded, the protruding end 381 tips the end of the base 353 in the receiving groove 371 all the time, but the axial rod 33 and the protruding portion 34 will rotate. When the first case 10 is at an angle of 180° to the second case 20, the axial rod 33 and the protruding portion 34 rotate through 180° and the protruding portion 34 binds on an opposite inner surface of the ring 351, such as the "B" point of the ring 351. The protruding portion 34 pushes the swing member 35 to revolve around the stick 36, the end of the base 353 tilts up and pushes the protruding end 381 from the receiving groove 371, and the protruding end 381 engages with one tooth 373 of the gear 37.

When the mobile phone is open, and a force is applied to the first case 10 to close it, the first case 10 swivels under a horizontal direction, the axial rod 33 and the protruding portion 34 drive the swing member 35 to revolve, the base 353 drives the gear 37 to rotate, and the protruding end 381 leaves one tooth to engage with another tooth of the gear 37 and the first case 10 is steady in that position. Therefore, the first case 10 may rotate relative to the second case 20 under the horizontal direction from any angle between about 0 and 180 degrees, and both the first case 10 and the second case 20 are in the same angular plane all the time.

Once the first case 10 rotates through 180° relative to the second case 20 under the horizontal direction, as shown in FIG. 4, the protruding portion 34 rotates at the "A" point and the mobile phone 1 is closed or folded. The gear 37 rotates through 180°, the protruding end 381 passes through the other second opening 372 and tips the base 353 again, and the gear 37 is immobile.

When the mobile phone is fully open, and a vertical force is applied to the first case 10, the first case 10 rotates on its longitudinal axis, the axial rod 33 and the protruding portion 34 drive the swing member 35 to revolve, the base 353 drives the gear 37 to rotate, and the protruding end 381 leaves one tooth to engage with another tooth of the gear 37 and the first case 10 is steady in that position. Therefore, the first case 10 may rotate 90 degrees in either direction from the coplanar, on the longitudinal axis of the second case 20.

When the mobile phone 1 is closed, the protruding end 381 of the spring clip 38 passes through one second openings 372 to tip the base 353 and the gear 37 is immobile. Therefore, when the mobile phone 1 is folded into the closed position, as the first case 10 turns through 180° relative to the second case 20, the first case 10 rotates relative to the second case 20 under the horizontal direction or the vertical direction from any angle between about 0 and 180 degrees.

Although the present disclosure has been specifically described on the basis of the exemplary embodiment thereof, the disclosure is not to be construed as being limited thereto. Various changes or modifications may be made to the embodiment without departing from the scope and spirit of the disclosure.

What is claimed is:

1. A folding electronic device comprising: a first case; a second case; and a hinge element comprising a shaft, a swing member, a gear, a stick, and a spring clip; and wherein the shaft is connected to the first case and passes through the swing member, the shaft is snugly fitted between two opposite inner surfaces of the swing member and drives the swing member to revolve;

wherein the gear and the spring clip are connected to the second case, a receiving groove is formed in the middle of the gear and two openings extend from the two ends of the receiving groove, a protruding end is formed in the middle of the spring clip, when the spring clip is deformed, the protruding end engages with one tooth of the gear or passes through one opening to tip one end of the swing member; and wherein a connecting member is formed on a bottom of the cavity, the connecting member and the swing member define a round through hole respectively, the stick passes through the two round holes of the connecting member and the swing member to position the swing member.

wherein the hinge element further comprises a cavity configured to accommodate the shaft, wherein when the first case turns over an about 180 degree angle relative to the second case from a folded position, the shaft pushes the swing member to revolve, the protruding end of the spring clip extrudes from the opening of the gear and engages with one tooth of the gear, the first case rotates relative to the second case under the horizontal direction or the vertical direction from any angle between about 0 and 180 degrees.

2. The folding electronic device as recited in claim 1, wherein after the first case turns over at an about 180 degree angle relative to the second case, the first case rotates relative to the second case under the horizontal direction.

3. The folding electronic device as recited in claim 1, wherein after the first case turns over an about 180 degree angle relative to the second case, the first case rotates relative to the second case under the vertical direction.

4. The folding electronic device as recited in claim 1, wherein after the first case turns over at about 180 degree angle relative to the second case, when the first case rotates 180 degrees relative to the second case, the protruding end of the spring clip inserts into the receiving groove from one opening of the gear and tips the swing member.

5. The folding electronic device as recited in claim 1, wherein the folding electronic device is folded, the protruding end of the spring clip passes through one opening of the gear to tip the swing member and the gear is immobile.

6. The folding electronic device as recited in claim 1, wherein the shaft extends an axial rod from one end thereof, a protruding portion protrudes radically out of the axial rod towards the free end of the axial rod, one end of the swing member defines a ring and an elliptic through hole is formed in the middle of the ring, the axial rod passes through the elliptic through hole, the axial rod and the protruding portion is snugly fitted between two opposite inner surfaces of the ring and drives the swing member to revolve.

7. The folding electronic device as recited in claim 6, wherein the other end of the swing member is a base, a swing rail extends from the middle of the base, the other end of the swing rail defines the ring, and the receiving groove accommodates the base.

8. The folding electronic device as recited in claim 6, wherein the protruding portion is a nipple-like boss or nub.

9. The folding electronic device as recited in claim 7, wherein the base is rectangular.

10. The folding electronic device as recited in claim 7, wherein the base and the rail together substantially forming the shape of an inverted "T".

* * * * *